US008762561B2

(12) United States Patent
Kamath et al.

(10) Patent No.: US 8,762,561 B2
(45) Date of Patent: Jun. 24, 2014

(54) SYSTEM, METHOD OR APPARATUS FOR COMBINING MULTIPLE STREAMS OF MEDIA DATA

(75) Inventors: Nidish R. Kamath, San Diego, CA (US); Prajakt Kulkarni, San Diego, CA (US); Robert Vachon, Zebulon, NC (US); Satish Goverdhan, San Diego, CA (US); Srivatsan Srinivasan, San Diego, CA (US); Alex Jong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 12/479,492

(22) Filed: Jun. 5, 2009

(65) Prior Publication Data

US 2010/0023637 A1 Jan. 28, 2010

Related U.S. Application Data

(60) Provisional application No. 61/083,058, filed on Jul. 23, 2008.

(51) Int. Cl.
G06F 15/16 (2006.01)
(52) U.S. Cl.
USPC .......................................... 709/231; 709/203
(58) Field of Classification Search
USPC .................. 709/203, 231, 246, 247, 217, 223
See application file for complete search history.

(56) References Cited

U.S. PATENT DOCUMENTS

| 5,438,531 | A | | 8/1995 | Shank |
| 5,478,156 | A | * | 12/1995 | Kikuchi et al. .......... 400/120.01 |
| 5,768,126 | A | | 6/1998 | Frederick |
| 5,848,295 | A | | 12/1998 | Anderson et al. |
| 5,986,589 | A | * | 11/1999 | Rosefield et al. ............... 341/61 |
| 6,859,851 | B1 | * | 2/2005 | Sheaffer .......................... 710/52 |
| 7,444,194 | B2 | | 10/2008 | Fay et al. |
| 7,769,035 | B1 | * | 8/2010 | Breau et al. ................... 370/412 |
| 2002/0116178 | A1 | * | 8/2002 | Crockett .................... 704/200.1 |
| 2005/0011341 | A1 | * | 1/2005 | Petef ............................... 84/622 |
| 2005/0043959 | A1 | | 2/2005 | Stemerdink et al. |
| 2006/0013077 | A1 | * | 1/2006 | Mesarovic et al. ........ 369/30.01 |
| 2006/0247919 | A1 | * | 11/2006 | Specht et al. ................. 704/201 |
| 2006/0259774 | A1 | * | 11/2006 | Swoboda et al. ............. 713/176 |
| 2007/0110151 | A1 | * | 5/2007 | Yu et al. ................... 375/240.03 |
| 2008/0147213 | A1 | | 6/2008 | Omiya et al. |

FOREIGN PATENT DOCUMENTS

| CN | 1511312 | A | 7/2004 |
| JP | S6319920 | A | 1/1988 |
| JP | 3002950 | A | 1/1991 |
| JP | 6168575 | A | 6/1994 |
| JP | H0735781 | A | 2/1995 |
| JP | 11213558 | A | 8/1999 |
| JP | 2002351470 | A | 12/2002 |
| JP | 2004527000 | A | 9/2004 |
| JP | 2005287041 | A | 10/2005 |
| JP | 2008140461 | A | 6/2008 |

OTHER PUBLICATIONS

Gonzalez, A. et. al.: "Audio Mixing for Interactive Multimedia Communications" Joint Conference on Intelligent Systems, vol. 3, Oct. 23, 1998; pp. 1-5, XP001145994.
"International Search Report—PCT/US2009/051601—International Search Authority, European Patent Office, Nov. 16, 2009."
"Written Opinion—PCT/US2009/051601, International Search Authority, European Patent Office, Nov. 16, 2009."
MSM 7500 Software Interface Manual, 80-v6930-62_revB.
Taiwan Search Report—TW098124919—TIPO—Feb. 19, 2013.

* cited by examiner

*Primary Examiner* — Lashonda Jacobs
(74) *Attorney, Agent, or Firm* — Espartaco Diaz Hidalgo

(57) ABSTRACT

Embodiments of methods, apparatuses, devices and systems associated with combining or mixing digital media streams are disclosed.

41 Claims, 7 Drawing Sheets

SYSTEM, METHOD OR APPARATUS FOR COMBINING MULTIPLE STREAMS OF MEDIA DATA

RELATED APPLICATIONS

The present Application for Patent claims priority to Provisional Application No. 61/083,058, entitled "METHOD FOR MIXING AND REAL TIME PLAYBACK OF MULTIPLE INDEPENDENT AUDIO STREAM IN MULTI-PROCESSING ENVIRONMENT" filed Jul. 23, 2008, and assigned to the assignee hereof and hereby expressly incorporated by reference herein.

FIELD

Embodiments relate to the field of mixing or combining streams of media data and, more specifically, to combining multiple streams of digital media data.

BACKGROUND

Media devices, such as mobile phones, PDAs, computing platforms, etc., may, under some circumstances play or perform multiple streams of digital media data at least in part simultaneously or concurrently. For example, a mobile phone may, under some circumstances play audio streams corresponding to a music file, a voice call, an alert sound, a game sound, etc., or some combination thereof in an at least in part concurrent manner.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

Figure 1:
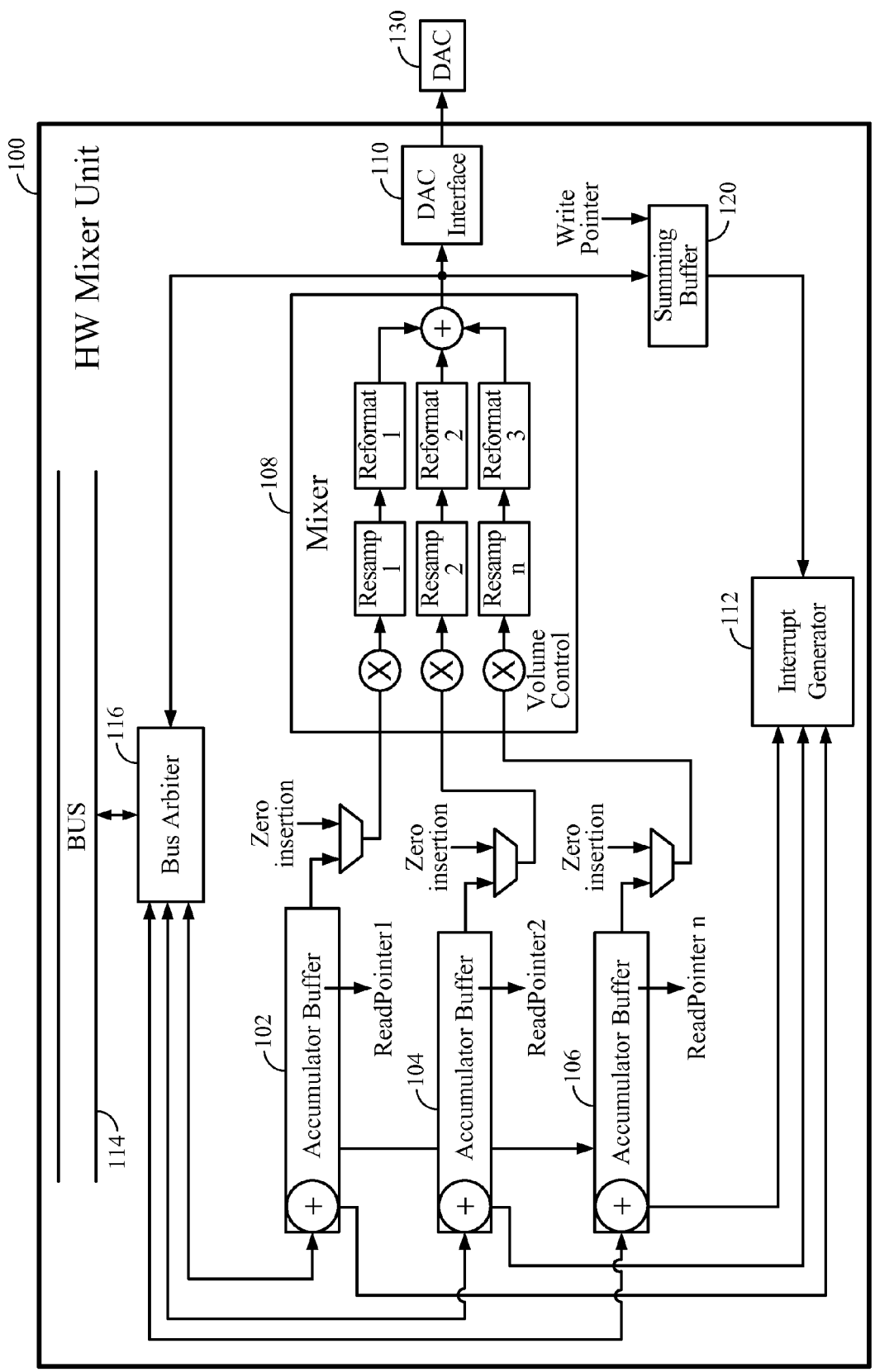
FIG. 1 is a schematic diagram of a system including one or more accumulator buffers in accordance with an embodiment.

In the following detailed description, numerous specific details are set forth to provide a thorough understanding of claimed subject matter. However, it will be understood by those skilled in the art that claimed subject matter may be practiced without these specific details. In other instances, methods, procedures, components or circuits that would be known by one of ordinary skill have not been described in detail so as not to obscure claimed subject matter.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Media devices, such as mobile phones, PDAs, computing platforms, etc., may, under some circumstances play or perform multiple streams of digital media data at least in part simultaneously or concurrently. For example, a mobile phone may, under some circumstances play or perform audio streams corresponding to a music file, a voice call, an alert sound, a game sound, etc., or some combination thereof in an at least in part concurrent manner. As used herein, the term "digital media data" refers to binary digital signals in which physical attributes or physical manifestations capable of being perceived by a human being are represented, including, for example, audio data, video data, image data, or the like. One possible solution to this is to employ a software module or hardware component to sum digital media streams that overlap in time together, such as audio streams, for example, and feed the summed audio streams to a digital to analog converter (DAC). For example, this is may be achieved if the audio streams are played using a single multi-threaded processor. However, if a system employs multiple processors generating multiple streams of digital media data, or a single processor generating multiple streams of digital media data, it may be challenging for a software module or hardware component, as discussed above, to properly coordinate or synchronize among the multiple streams of media data. In addition, under some circumstances, different audio streams may be generated at different sampling rates or for different channel formats. By way of example, a playback of an mp3 music file may be generated with 2 audio channels at a sampling rate of 44.1 kHz, whereas voice data, such as from a phone call, may be generated with a single audio channel at a sampling rate of 8 kHz. In this example, the two streams of media data may be re-sampled at a single sampling rate and converted to a 2 audio channel format in order to be mixed together. However, doing so may involve some complexity of hardware and/or processing.

However, an embodiment, as described in more detail below, by contrast, relates to a hardware component operable to mix multiple digital media data streams in place or in situ. For example, a hardware component, such as an accumulator buffer, may be operable to mix multiple digital media data streams and maintain at least partial synchronization of the streams. In at least one embodiment, one or more hardware components may re-sample multiple digital media data streams to a single or common sampling rate and convert those streams to a common channel format at least in part to facilitate in place or in situ mixing of those streams. In an embodiment, a hardware component, such as a accumulator buffer, for example, may be operable to mix media streams from multiple sources, such as multiple processors, and operable to mix multiple media streams originating from a single processor. As used herein, "mixing" refers to at least partially combining two or more binary digital signals to form a binary digital signal in which one or more characteristics of the signals being mixed are represented. As used herein, "common channel format" refers to a representation of binary digital signals in which the signals are intended to be played or performed in a particular or distinct channel configuration, such as, without limitation, having a left channel and a right channel, that is common to signals that may not necessarily originate from the same source. For example, a first signal may have a left and a right channel, and a second signal having a common channel format may also have a left and a right channel. As used herein, an "accumulator buffer" refers to a device or piece of hardware exhibiting features of both a buffer and an accumulator. A buffer typically includes memory locations in which to store binary digital signals. An accumulator typically has the capability to perform arithmetic operations, particularly the arithmetic summing operation. Here, as described in more detail later, for this particular embodiment, a device having features of both may include one or more memory locations operable to mix multiple media streams in place or in situ, as shall be described. For example, an accumulator buffer may comprise a solid state memory buffer operable to mix or combine multiple media streams in place or in situ, at least in part by allowing multiple signal sources to be written to memory locations of the accumulator buffer.

In an embodiment employing digital media signals, the binary digital signals themselves may correspond to particular instances or samples in time relative to a particular physical attribute or manifestation, such as, for example, without limitation, sound. Therefore, likewise, one or more addresses, such as, without limitation, sequential addresses, within an accumulator buffer may correspond to a time scale, such that a particular address of a particular location within the accumulator buffer may correspond to a particular time instance. In an embodiment, therefore, multiple processors may write to any appropriate memory locations of an accumulator buffer so that temporally overlapping portions of a digital media data stream, such as an audio stream, may be combined in place or in situ with timing for the audio stream being aligned; however, doing so without the use or additional buffers, for example. At least in part by writing multiple streams to appropriate memory locations in an accumulator buffer, the multiple streams may be mixed with respect to portions of the multiple streams that overlap with respect to particular instances in time. It should, however, be noted that this is merely an illustrative example relating to digital media data streams and that claimed subject matter is not limited in this regard.

FIG. 1 is a schematic diagram of a system 100 including an accumulator buffer 102 in accordance with an embodiment. With regard to FIG. 1, an embodiment may comprise one or more memory locations, such as accumulator buffers 102, 104, and 106, for example. In addition, an embodiment may further comprise a mixer 108, such as one or more circuits operable to re-sample or reformat and mix, for example. Furthermore, an embodiment may further comprise a Digital-To-Analog Conversion (DAC) interface, such as DAC interface 110, for example. An embodiment may also comprise an interrupt generation unit, such as interrupt generator 112, for example. In an embodiment, accumulator buffers 102, 104, or 106 may be coupled to a system bus 114, such as via a Bus arbiter 116, for example. In an embodiment, bus 114 may comprise a bus that may employs signaling compliant or compatible with at least one of the following: an Advanced Microprocessor Bus Architecture (AMBA); High-Speed Bus (AHB), Advanced eXtensible Interface (AXI); or other bus signaling protocol, to name but a few examples. In an embodiment, accumulator buffers 102, 104, and 106 may be coupled to bus 114 as one or more slave units, such that accumulator buffers 102, 104, and 106 may be at least partially accessible to one or more processors (not shown) associated with system 100. In an embodiment, mixer unit 108 may, under some circumstances, be programmed by any of the one or more processors associated with system 100, to perform one or more mixing tasks, such as re-sampling from one or more media streams having one or more sampling rates, channel formats, or the like. In an embodiment, a sampling rate, channel format, or the like may be associated with a particular one of the accumulator buffers. For example, accumulator buffer 102 may correspond to a first sampling rate, a first channel format, or the like, while accumulator buffers 104 and 106 may correspond to different sampling rates, channel, formats, or the like. In an embodiment, system 100 may further comprise a summing buffer, such as summing buffer 120, for example. In an embodiment, mixer 108 may write one or more mixed samples to summing buffer 120 for subsequent access to those samples by DAC interface 1 10. For example, DAC interface 110 may transmit the mixed sample to DAC 130, such as for playback through an audio or video system. It should be noted that these are merely illustrative examples relating to a system or system configuration and that claimed subject matter is not limited in this regard.

In an embodiment, accumulator buffers 102, 104, and 106 may be configured to at least in part correspond with a respective sampling rate, channel format, and/or the like. In this embodiment, any of the one or more processors (not shown) may transmit a media stream to any of the accumulator buffers having a sampling rate, channel format, and/or the like that corresponds to the media stream. For example, a processor may write to an appropriate one of the accumulator buffers at least in part by writing to a bus address corresponding to a portion of the appropriate accumulator buffer. In addition, a paused media stream may write one or more zero values into an accumulator buffer. For example, if a particular media stream has been paused, such as by a user or at least in part in response to an event, a corresponding read pointer in a particular accumulator buffer may be frozen and an output from such an accumulator buffer to the mixer may be replaced with zeros. In this example, if the pause is de-asserted, the read pointer may continue from where it had been stopped. Depending on the memory word size, the audio stream format and the bits per channel of the audio samples, an audio sample might consist of multiple words. For example, a 32-bit memory word size, 5.1 audio (six channels) and 16-bits per channel, each audio sample consists of three words. Under these circumstances, a sample boundary may occur when either a number of words for a sample or a multiple thereof, depending on a particular format, has been read out of a buffer. Under some circumstances, the concept of sample boundary may be useful, such as during application of a pause, or zero insertion, or changing a volume for a particular audio source. In an embodiment, such a zero insertion or change in volume may be desirable to be applied on a sample boundary at least in part to ensure that all channels in the sample at which the change (pause/volume) is introduced reflect such a change. In addition, under some circumstances it may be less desirable to insert a zero value, as such an insertion may result in a sound distortion, such as a pop. In such circumstances, it may be desirable to gradually decrease to a zero value using, for example, a linear, exponential, logarithmic, and/or sinusoidal model to more gradually decrease subsequent signal values, to name but a few examples. Logic for such a procedure may be in one or more of the controller circuits described herein, or alternatively in a separate circuit for smoothing such zero insertion values, for example. In addition, different channels, or processor sources may employ different ramp down processes that may be more desirable for a particular source. Another circumstance under which it may be desirable to maintain sample boundaries may be at mixer 108. For example, if a new stream is enabled for mixing, it should start mixing only on a sample boundary at least in part to ensure that the same channels from all streams get added together. It should, however, be noted that this is merely an illustrative example relating to mixing audio samples and that claimed subject matter is not limited in this regard.

In an embodiment, addresses within an accumulator buffer may correspond to time instances for a particular time scale, such that a location within the accumulator buffer corresponds to a particular time instance. In an embodiment, multiple processors may write to one or more portions of an accumulator buffer. For example, media streams within an accumulator buffer may at least in part temporally overlap. At least in part by writing multiple streams to appropriate locations in an accumulator buffer, the multiple streams may be mixed with respect to portions of the multiple streams that overlap with respect to time. Within a particular accumulator buffer, streams may be stored in an at least partially interleaved format in an embodiment. For example, one or more channels of a media stream may be followed by one or more other channels of that media stream. Take, for example, a 2 channel media stream corresponding to a stereo audio stream. In this example, the media stream may be stored in the accumulator buffer as follows: L0 R0 L1 R1 ... Ln Rn; where Lx is the left channel value and Rx is the right channel signal value of signal sample x. In an embodiment, one or more accumulator buffers may be of different sizes, though this is not in any way necessary. For example, it may be desirable to have accumulator buffers of differing sizes at least in part to accommodate one or more different aspects of media stream being written to the one or more buffers, such as to address one or more differences in latency issues relating to the respective media streams. For example, accumulator buffer 102 may have a size of approximately 192 kB, at least in part so that accumulator buffer 102 may accommodate up to 1 second of audio data sampled at 48 KHz and having a 16-bit stereo format, while accumulator buffer 104 may have a size of approximately 1600 bytes, at least in part so that accumulator buffer 104 may accommodate up to 100 ms of 15 bit mono formatted data. It should, however, be noted that these are merely illustrative examples relating to memory units and that claimed subject matter is not limited in this regard.

In an embodiment, system 100 may also include a buffer controller unit, such as a combination of one or more buffer control circuits. For example, a buffer control unit may include a first controller operable to clear an accumulator buffer intermittently at least in part so that one or more subsequent media stream may be processed in place. For further example, a buffer control unit may also include a second controller operable to provide an indication if such an accumulator buffer has been cleared. In this example, such an indication may be provided to one or more processors writing to the buffer. As yet another example, a buffer control unit may include yet another controller operable to clear one or more portions of multiple media streams at least in part in response to a completed read operation of a portion of the accumulator buffer containing those media streams. It should be noted that the buffer control unit may be implemented as one or more circuits or units. For example, a separate circuit may provide one or more of the above functions of the buffer control unit, and be operable to communicate with one or more other circuits providing other of the above functions, though of course claimed subject matter is not limited in this regard. In an embodiment, the buffer control unit may clear an accumulator buffer on deassertion of reset or if a software component activates the buffer control unit. In an embodiment, the buffer control unit may clear any particular location in an accumulator buffer at least in part in response to reading that particular location of the accumulator buffer. In addition, one or more portions of the buffer control unit may be physically disposed within one or more accumulator buffers. For example, one or more of the controllers within buffer control unit may be a portion of a read circuit or circuitry associated with an accumulator buffer. Likewise, other controllers of buffer control unit may be a portion of a read circuit or circuitry associated with a read mechanism or circuit of an accumulator buffer.

In an embodiment, mixing unit 108 may be operable to up-mix or down-mix the media data from the one or more accumulator buffers to a particular sample rate or channel format associated with a particular DAC codec. In an embodiment, an optional volume control scheme may be applied to one or more media streams, such as prior to an up-mixing or down-mixing process, for example. In an embodiment, an up-mixing process may comprise a process where an existing number of channels for a media stream may be smaller than a desired number of channels for that media stream. In an embodiment, a down-mixing process may comprise a process where an existing number of channels for a media stream is greater than a desired number of channels for that media stream. A variety of up-mixing or down-mixing processes may be employed by mixing unit 108. For example, mixing unit 108 may apply a matrix transformation process where a signal value of signal sample of an output channel may comprise a linear combination of one or more signal values of signal samples of an input channel. For further example, other processes may include spatial processing or other filtering, such as HRTF filters, room acoustic processing, FIR, IIR, or the like. It should, however, be noted that these are merely illustrative examples relating to a mixing unit and that claimed subject matter is not limited in this regard.

Figure 2:
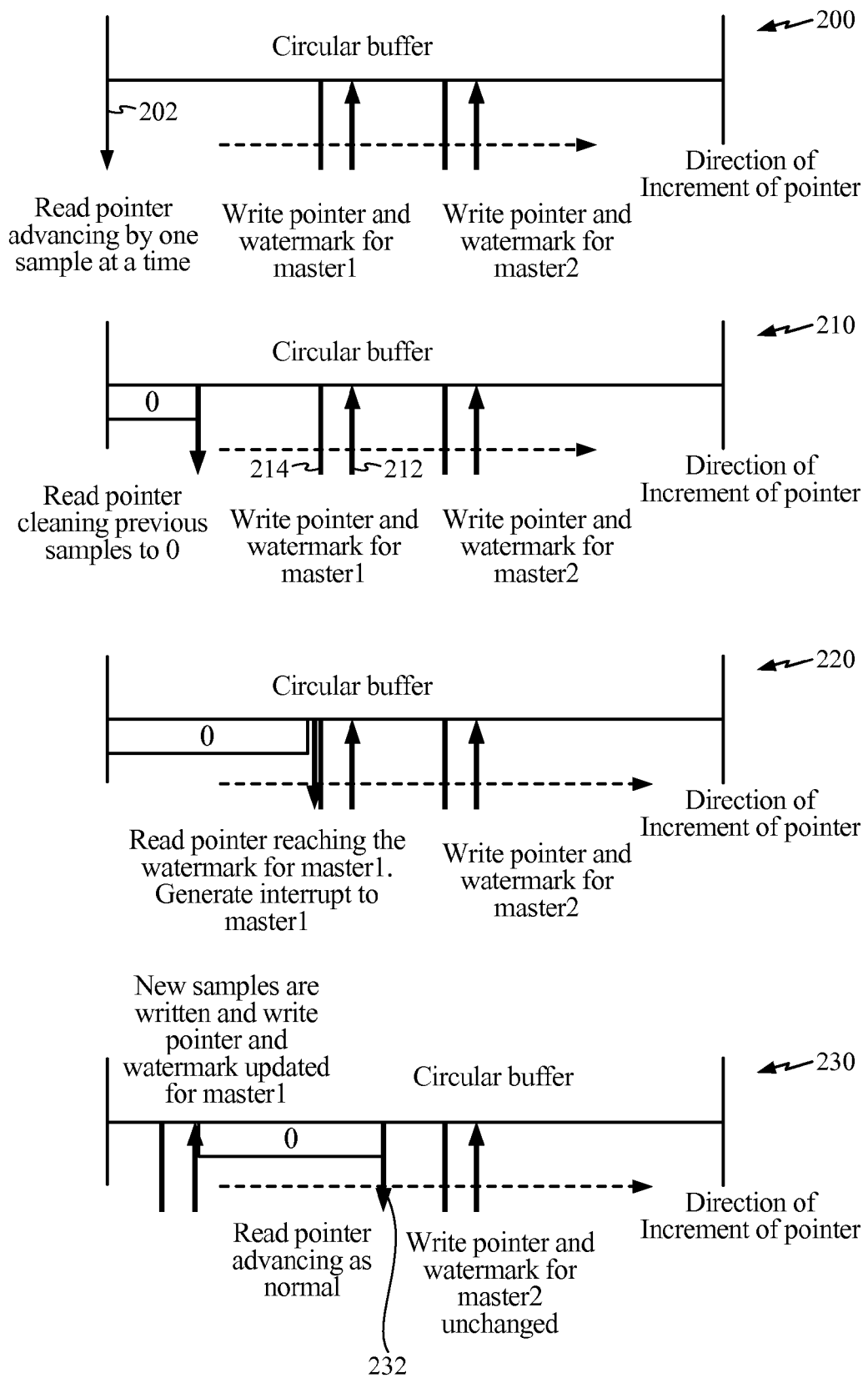
FIG. 2 is a schematic diagram depicting one or more aspects of the operation of the embodiment of FIG. 1.

FIGS. 2 is a schematic diagram depicting one or more aspects of operation of accumulator buffer 200 in accordance with an embodiment. With regard to FIG. 2, in an embodiment, a read pointer 202 may be maintained for the one or more accumulator buffers, such as accumulator buffer 200, for example. In an embodiment, read pointer 202 may be used at least in part for reading out one or more samples from buffer 200. Furthermore, if a sample is read out of buffer 200, then read pointer 202 may be moved to a next sample, as shown in accumulator buffer 210. In an embodiment, a read request may originate from one or more sources, such as mixing unit 108, from FIG. 1. In an embodiment, read pointer 202 may be moved within accumulator buffer 200 based at least in part on a channel format, sampling rate, or the like associated with media data in accumulator buffer 200. For example, if a channel format in accumulator buffer 200 comprises 16-bit stereo media data, and accumulator buffer 200 comprises 32-bit locations, a read request may result in read pointer 202 being moved by 1 32-bit word within accumulator buffer 200 in response to a completed read request. For an additional example, if a channel format in buffer 200 comprises 32-bit 6-channel audio, and accumulator buffer 200 comprises 16-bit memory locations, a read request may result in read pointer 202 being moved by 12 16-bit words within accumulator buffer 200 in response to a completed read request. In essence, read pointer 202 may typically be advanced by an amount corresponding to a substantially complete sample within accumulator buffer 200. It should, however, be noted that this is merely an illustrative example relating to an accumulator buffer and that claimed subject matter is not limited in this regard.

In an embodiment, mixing unit 108 may be operable to communicate with DAC unit 110 at least in part to provide DAC interface unit 110 with samples from the one or more accumulator buffers at least in part for audio playback, such as with system 100, for example. For example, DAC interface unit 110 may request one or more samples from mixing unit 108. In an embodiment, mixing unit 108 may request one or more read actions from the one or more accumulator buffers. In at least one embodiment, an optional volume control action may be applied to the one or more streams of media data, such as to allow mixing unit 108 to determine an appropriate mix for multiple streams of media data. In an embodiment, mixing unit 108 may re-sample or reformat one or more samples from the one or more accumulator buffers in a manner compatible with a DAC codec. Furthermore, re-sampled and reformatted data may additionally be mixed and passed onto a DAC codec via DAC interface unit 110. It should, however, be noted that these are merely examples relating to mixing multiple media streams and that claimed subject matter is not limited in this regard. As one example, the digital media data may comprise something other than audio data However, in an embodiment, mixing unit 108 may store a sample sent to DAC interface unit 110 into a buffer, such as summing buffer 120, for example. In an embodiment, accumulator buffer 210 may be attached to a system bus, such as bus 114 shown in FIG. 1 at least in part so that one or more processors may read from or write to accumulator buffer 210. In an embodiment, a write pointer 212 may be maintained within accumulator buffer 210 at least in part to indicate where media data is being, or will be, written into accumulator buffer 210. In an embodiment, a watermark 214 also maintained in accumulator buffer 210. As used herein, a "watermark" refers to demarcation between memory locations of a buffer or accumulator buffer, for example. For example, a watermark may comprise an indication of a location within a buffer corresponding to the end location for a completed sample from one or more sources, the end location for a completed write operation from one or more sources, or the end location a completed read operation from one or more sources. Of course, in alternate embodiments, a watermark may indicate another demarcation. For example, it may indicate a beginning location for a completed sample, etc. However, in this embodiment, if a write pointer, such as write pointer 212 reaches watermark 214, an interrupt request may be generated, as shown in buffer 220. For example, at least in part in response to an interrupt request, a processor may wake up and read out at least a portion of the samples from buffer 220. In an embodiment, accumulator buffer 230 depicts a read pointer 232 advanced within accumulator buffer 230 beyond a write pointer and watermark associated with a first processor and advancing towards a watermark associated with a second processor. In this manner, multiple processors may write to the buffer, read from the buffer, and receive interrupt requests based at least in part on a write pointer or read pointer reaching there respective watermarks within a buffer. In addition, as shown in FIG. 2, an accumulator buffer may include multiple write pointers and watermarks. For example, one or more processors writing to an accumulator buffer may have corresponding respective write pointers and watermarks at least in part so that multiple processors may write to an accumulator buffer and at least in part so that the accumulator buffer may mix or process multiple streams from one or more processors in place or in situ. It should be noted, that if a read pointer reaches an end of an accumulator buffer, it may roll over and be moved to a beginning of that buffer. In this manner, a buffer, as depicted in FIG. 2, may comprise a circular buffer. It should, however, be noted that these are merely illustrative examples relating to a buffer and that claimed subject matter is not limited in this regard.

Figure 3:
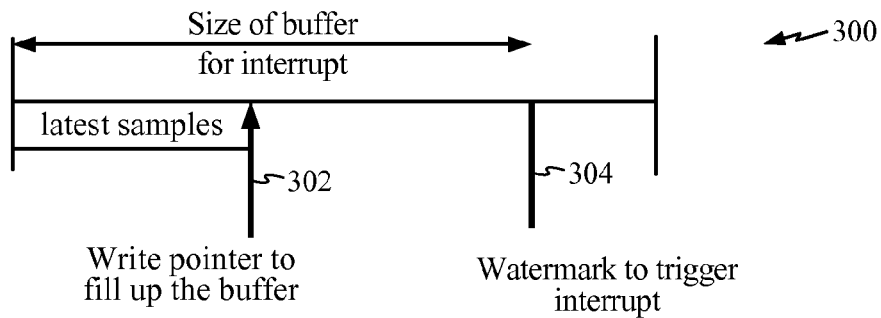
FIG. 3 is a schematic diagram depicting one or more other aspects of the operation of the embodiment of FIG. 1.
Figure 3:
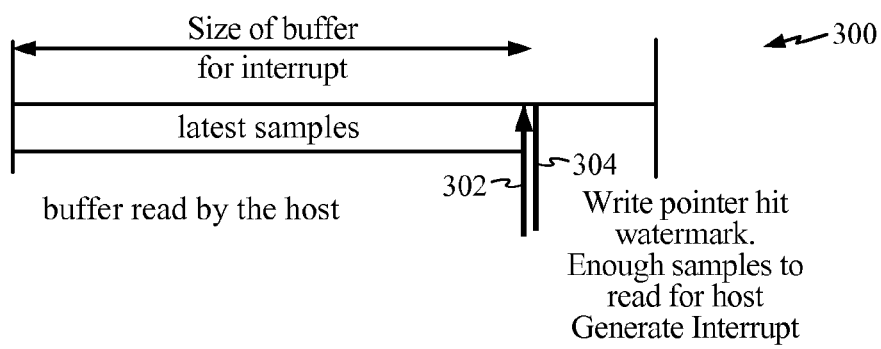
Figure 3:
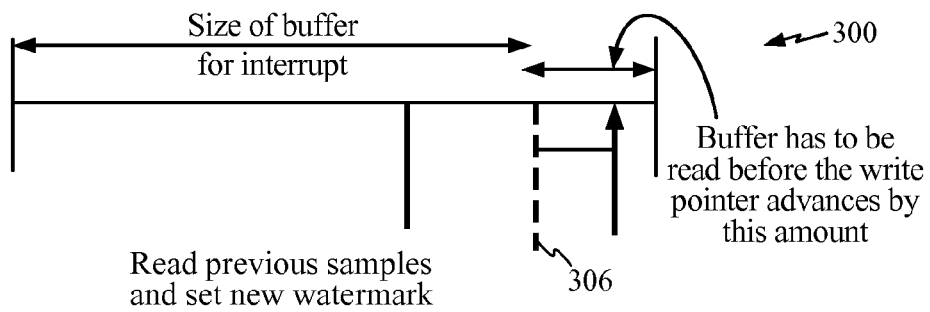
Figure 3:
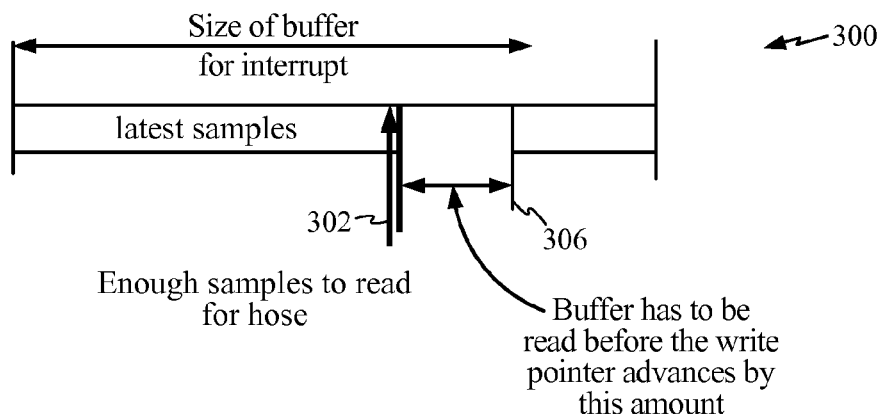

FIG. 3 is a schematic diagram depicting one or more other aspects of a summing buffer 300 in accordance with an embodiment. In an embodiment, summing buffer 300 may include a write pointer 302 and a watermark 304. As shown in FIG. 3, if write pointer 302 reaches watermark 304 an interrupt may be generated at least in part to signal one or more processors to begin reading data from summing buffer 300. In addition, a processor reading from or writing to summing buffer 300 may set a new watermark. In this particular embodiment, summing buffer 300 should be read before write pointer 302 advances a certain amount within summing buffer 300, such as before write pointer 302 advances to previously written but not yet read data, for example. Accordingly, it may be desirable to set watermarks such that there is ample time for a processor to read data out of summing buffer 300 prior to that data being overwritten by a subsequent write process, though, of course, claimed subject matter is not limited in this regard.

Figure 4:
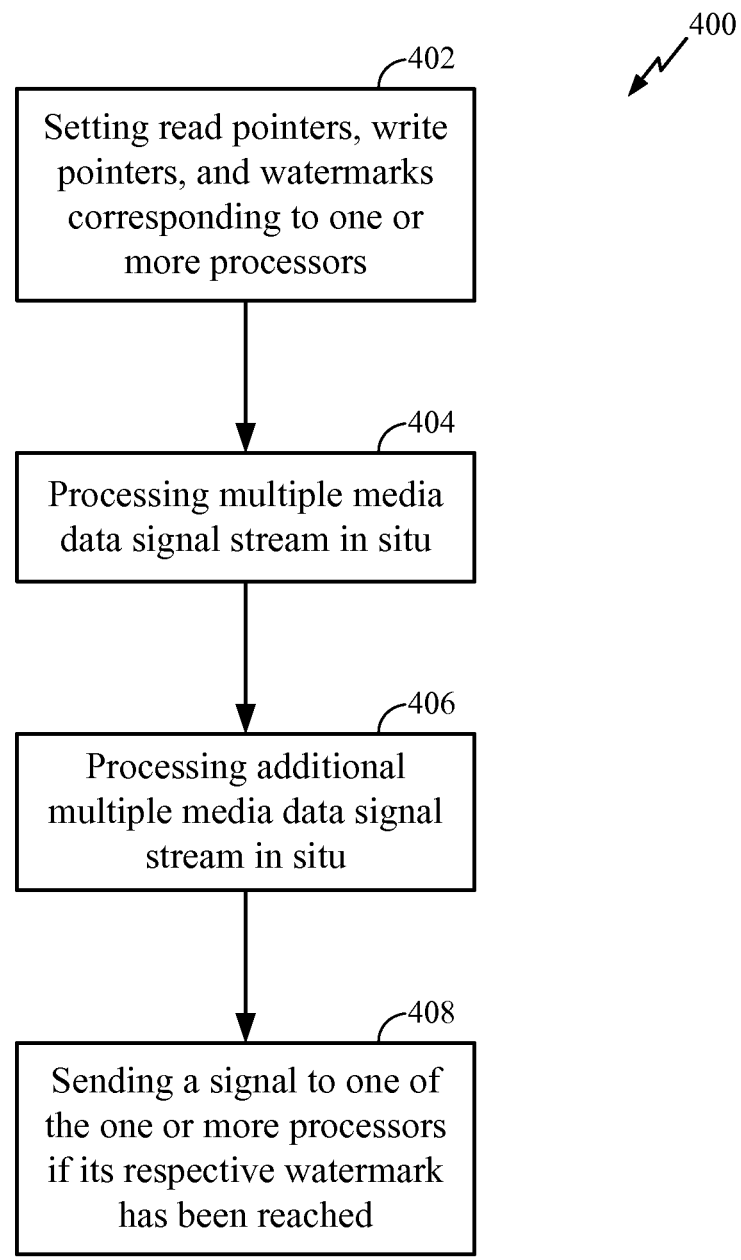
FIG. 4 is a flow chart representation of a process in accordance with an embodiment.

FIG. 4 is a flow chart representation of a process 400 in accordance with an embodiment. With regard to box 402, a system or process may set one or more read pointers, write pointers, or watermarks corresponding to one or more processors in an accumulator buffer. For example, a respective processor may set a read pointer, a write pointer or a watermark for itself within an accumulator buffer. With regard to box 404, an accumulator buffer may process multiple media data signal streams in place or in situ. For example, if multiple processors are writing to an accumulator buffer, such a buffer may process or mix those signals in place or in situ while those streams are being written to the buffer. With regard to box 406, a system or process may process additional multiple media data signal streams in place or in situ. For example, a system or process may include additional accumulator buffers, such as shown with regard to FIG. 1, where those additional accumulator buffers process or mix additional multiple media data signals in place or in situ while those streams are being written to those additional accumulator buffers. With regard to box 408, a signal may be sent to one or more one or more processors if a watermark for that processor has been reached. For example, if a write pointer corresponding to a processor has reached a watermark corresponding to that processor an interrupt generation unit may send a signal to that processor at least in part to inform that processor that a write application has been completed. Alternatively, if a read pointer associated with a processor has reached a watermark associated with that processor, an interrupt generator may send a signal to that processor at least in part to inform that processor that its previously written data has been read. In an embodiment, at least in part in response to an interrupt signal, a processor may set a new write pointer and watermark for itself within an accumulator buffer. The processor may also begin a new write operation to that accumulator buffer. It should, however, be noted that these are merely illustrative examples relating to a system or process and that claimed subject matter is not limited in this regard.

Figure 5:
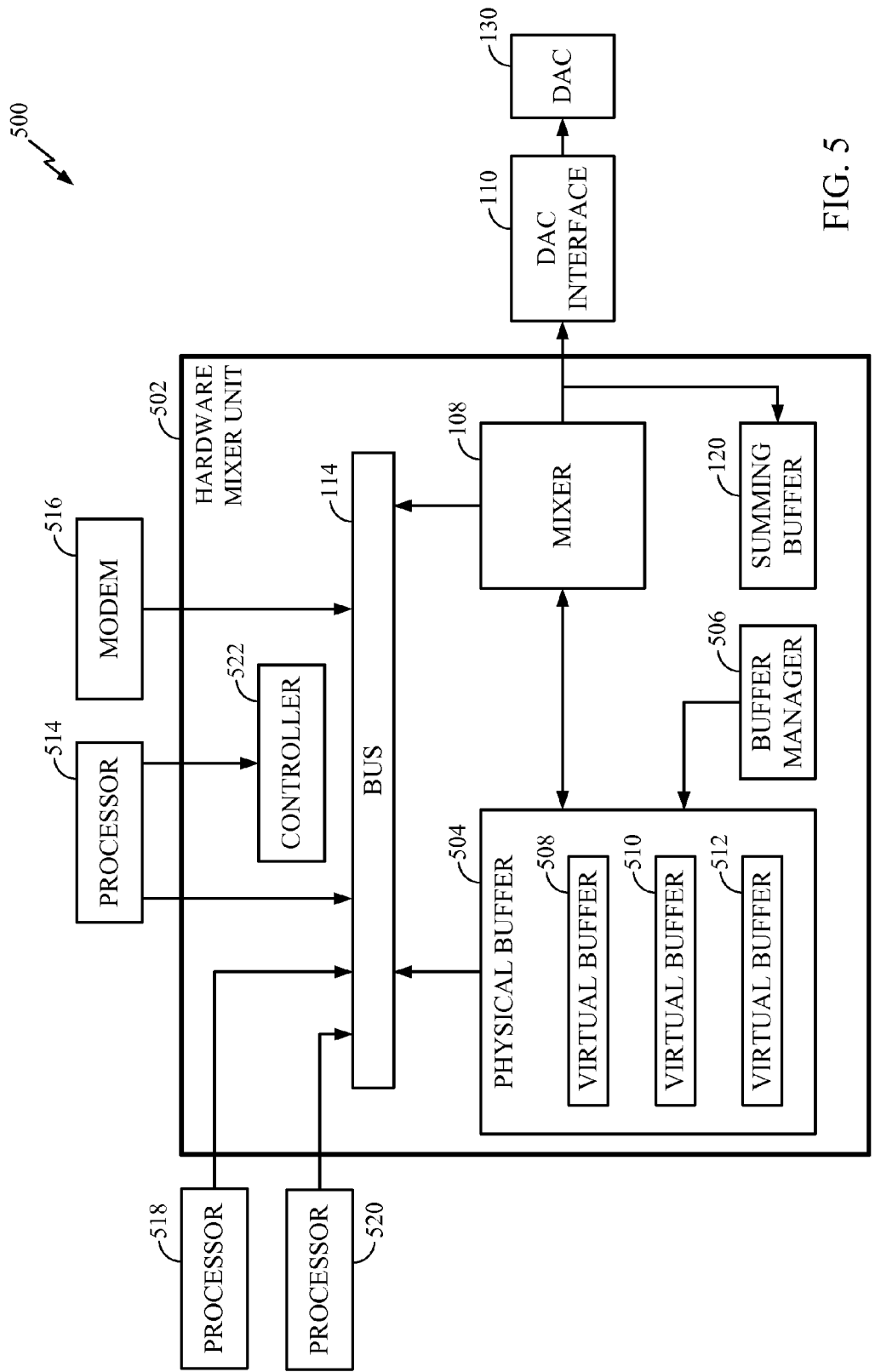
FIG. 5 is a flow chart of a logic control process of a read pointer read operation from an accumulator buffer in accordance with an embodiment.

FIG. 5, is a schematic diagram of a system 500 including a hardware mixer unit 502 in accordance with an embodiment. With regard to FIG. 5, system 500 may include one or more accumulator buffers. In this embodiment, the one or more accumulator buffer may comprise a physical memory device 504, such as a buffer or memory queue. In addition, system 500 may include a buffer manager 506. In this embodiment, buffer manager 506 may be operable to establish and maintain one or more virtual accumulator buffers within memory device 504. For example, buffer manager 506 may establish virtual accumulator buffers 508, 510, and 512 within memory device 504. Furthermore, in this embodiment, virtual accumulator buffers 508, 510 and 512 may be operable to mix signals from one or more sources in place within such virtual accumulator buffers. For example, virtual accumulator buffer may be operable to mix signals from processor 514 and modem 516 in place in conjunction with one or more read pointers, write pointers, and watermarks, as discussed above. For further example, virtual accumulator buffer 510 may likewise be operable to mix signals from a second processor 518 and third processor 520 in place in conjunction with one or more read pointers, write pointers, and watermarks, as discussed above. In addition, system 500 may a controller 522 operable to directly or indirectly communicate with one or more of the processors. In this example, controller 522 may be operable to implement one or more of the read pointer or write pointer processes described below, such as with regard to FIGS. 6 and 7. Furthermore, though depicted within hardware mixer unit 502, controller 522 may alternatively be implemented at one or more of the processors described or in conjunction with circuitry at one or more of the processors described. System 500 may be further operable to resample the mixed signals, such as by using a mixer, for example mixer 108 discussed with regard to FIG. 1, and output those resampled signals to a summing buffer, such as summing buffer 120. As discussed with regard to FIG. 1, the summed resampled signals may be read out by a digital to audio codec interface, such as DAC 110, for further processing by a digital audio codec, such as DAC 130. It should, however, be noted that these are merely illustrative examples relating to mixing signals from one or more processors and that claimed subject matter is not limited in this regard.

Figure 6:
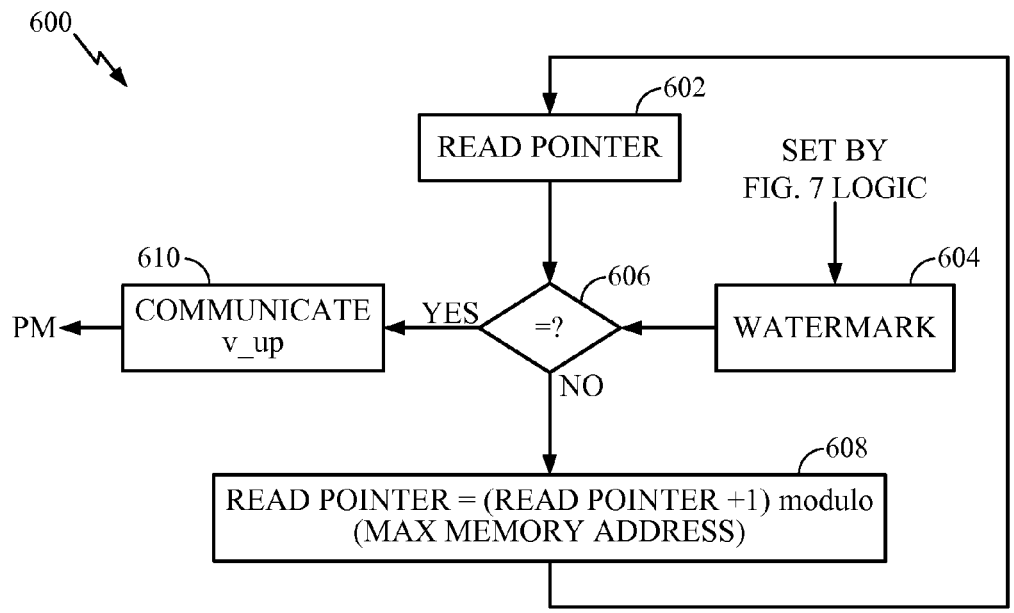
FIG. 6 is a flow chart of a logic control process of a write pointer write operation in accordance with an embodiment.

FIG. 6 illustrates a flowchart 600 for logic control of a read pointer 602 read operation from an accumulator buffer according to an embodiment. Such logic control may be performed by one or more circuits such as those described above. A watermark 604 may be set by a processor through the logic shown in FIG. 6 and may be continuously compared to a read pointer by a buffer control unit. In this example, a processor, such as one of the processors illustrated by example in FIG. 5, may write one or more audio samples to an accumulator buffer. In this example, if a read pointer 602 equals "YES", such as at box 606, a watermark signal may be communicated to the buffer control unit at box 610. Such a watermark signal may indicate that a corresponding processor is to be powered up. Such a watermark may also, using a signal V_up, indicate to a power manager that the operating voltage of the corresponding processor be raised. The corresponding processor may then begin normal audio bitstream decoding. If a read pointer does not equal a watermark, the read pointer may be incremented and set back to zero if it reaches a maximum address of a particular accumulator buffer or virtual accumulator buffer at box 608.

Figure 7:
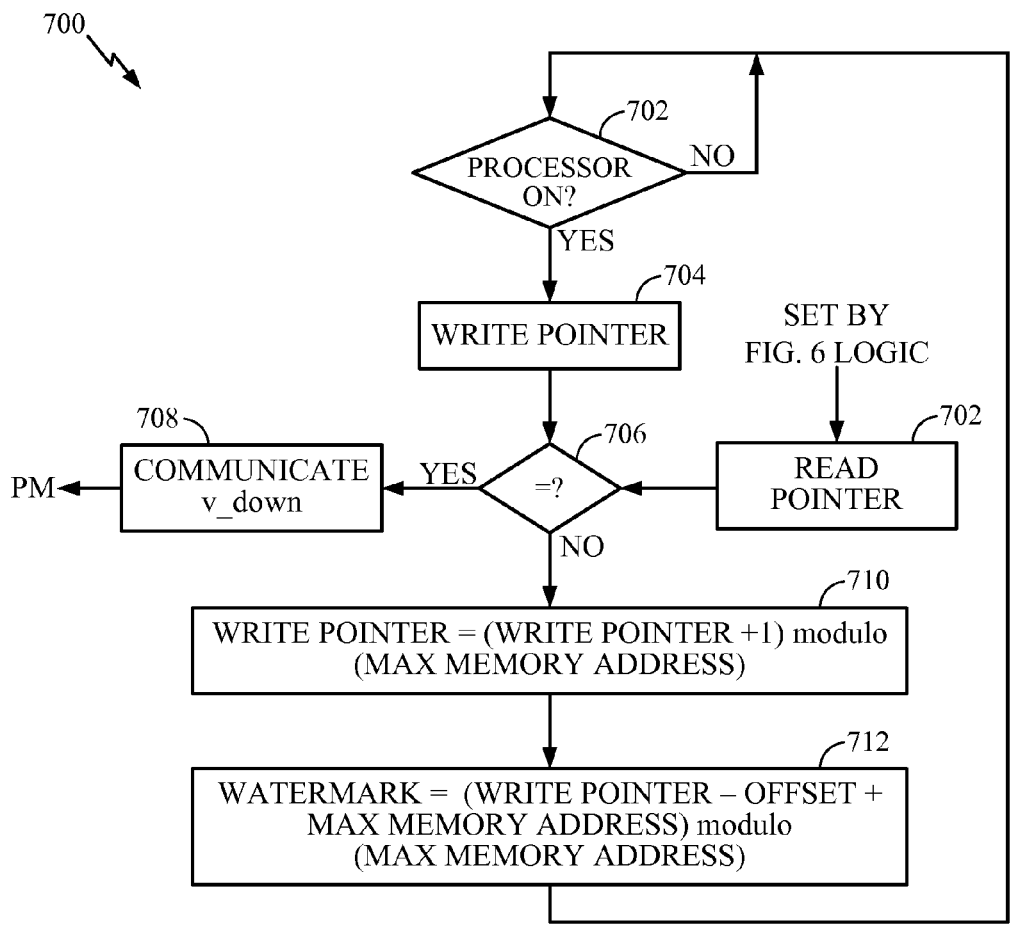
FIG. 7 is a schematic diagram of a system including an accumulator buffer and one or more processors in accordance with an embodiment.

FIG. 7 illustrates a flowchart 700 for logic control of a watermark and a write pointer according to an embodiment. Such logic control may be performed by one or more of the controllers described above. The logic should check at block 702 to determine whether a particular processor is on. If the particular processor is not on ("NO") the check at block 702 may be performed one or more additional times until the particular processor is on ("YES"). If the particular processor is on, it may be in the process of normal bitstream decoding and writing the audio output to a particular accumulator buffer, such as accumulator buffer 104 shown in FIG. 1, for example. If so, a write pointer 704 may be incremented to reflect the additional audio output provided by the processor to an accumulator buffer. In addition, a write pointer 704 and read pointer 602 may be compared at block 706. If, for example, pointers 602 and 704 are equal ("YES") then a signal, V_down, is transmitted at block 708 to a power manager associated with that particular processor. Such a V_down signal indicates that the operating voltage of the particular processor should be lowered to conserve energy. If, however, write pointer 704 does not equal read pointer 602, processor may write more audio samples to an accumulator buffer, and write pointer 704 may be incremented and set back to zero if it reaches a maximum address of a particular accumulator buffer or virtual accumulator buffer at block 710. A next watermark in such an accumulator buffer may equal the write pointer minus an offset plus the max memory address and set back to zero if it reaches a maximum address of a particular accumulator buffer or virtual accumulator buffer at block 712. In an embodiment, such offset may account for some amount of latency between a signal V_up, being sent to the power manager associated with a particular processor and a time required for that power manager to raise the operating voltage of the particular processor. As illustrated in FIG. 6, a watermark may used in comparison with a read pointer at least in part to control when the operating voltage of a particular processor may be raised, i.e. when a particular processor may be woken up.

Figure 8:
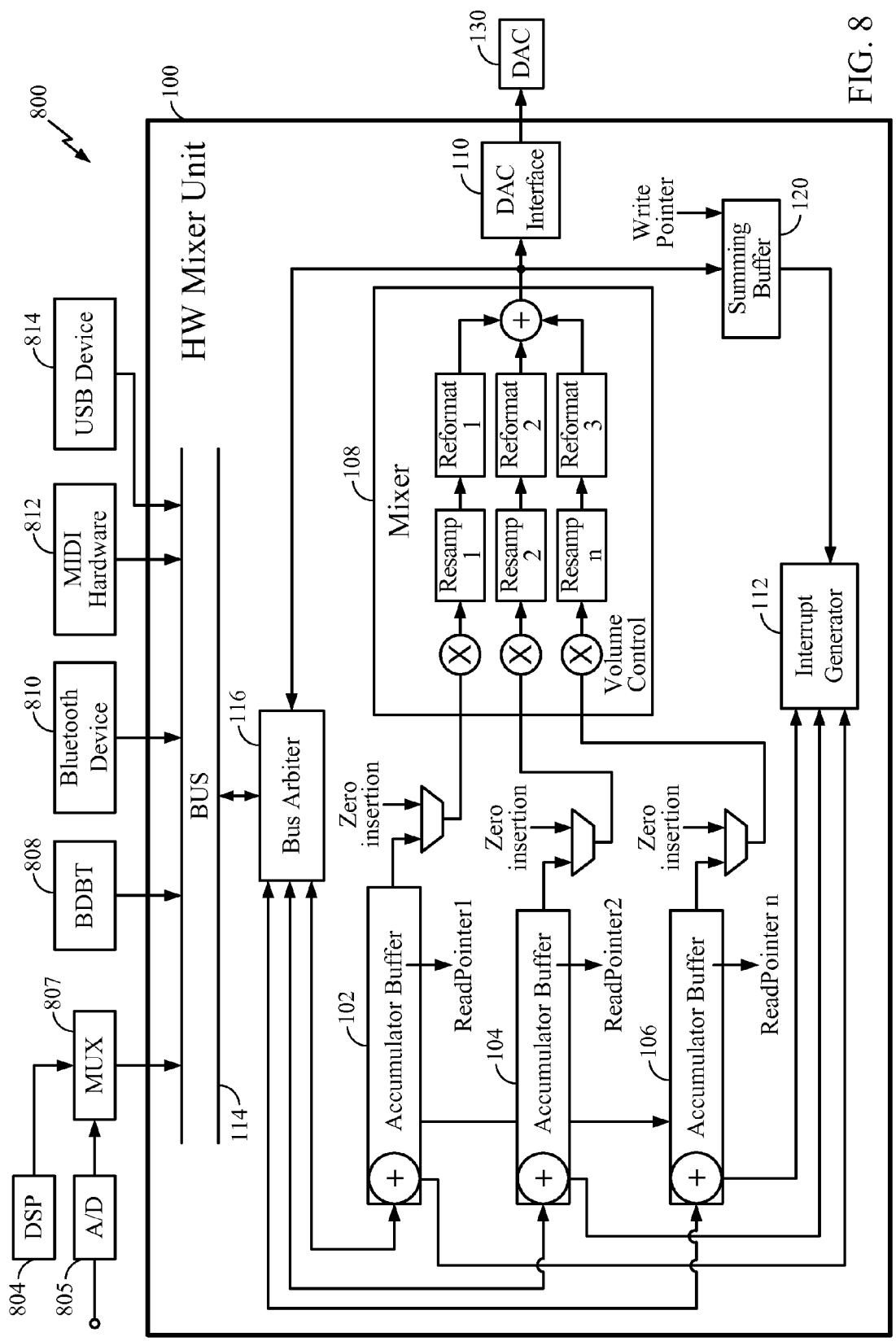
FIG. 8 is a schematic diagram of a system including one or more virtual accumulator buffers and one or more processors in accordance with an embodiment.

FIG. 8, is a schematic diagram of a system 800 including a hardware mixer unit 802. With regard to FIG. 8, hardware mixer unit 802 may be similar in structure and functionality to the hardware mixer unit, system 100, shown in FIG. 1. In this embodiment, one or more processors may be operably coupled to hardware mixer unit 802. For example, the one or more processors may include a digital signal processor 804 and a streaming audio source 806. In this embodiment, streaming audio source 806 may comprise an audio source such as a microphone whose signals may be processed by an analog to digital converter 805. Furthermore, in this embodiment digital signal processor 804 and streaming audio source 806 may be combined with one or more multiplexers 807 prior to being received by hardware mixer unit 802. System 800 may further include one or more BDBT processors 808, such as one or more processors providing signals corresponding to digital broadcast formats, a blue tooth device 810, a MIDI hardware processor 812, or a USB device 814, such as one or more USB compatible audio sources, to name but a few examples. As discussed above, signals from one or more of these sources may be combined in place in hardware mixing unit 802, such as by employing one or more accumulator buffers or virtual accumulator buffers in conjunction with a mixer and a summing buffer for example. It should, however, be noted that these are merely illustrative examples relating to sources of one or more signals that may be processed by a hardware mixer and that claimed subject matter should not be limited in this regard.

It should be noted that, although aspects of the above system, method, or process have been described in a particular order, specific order as provided by these examples is non-limiting. It should also be noted that systems, methods, or processes described herein, may be capable of being performed by one or more computing platforms. In addition, the methods or processes described herein may be capable of being stored on a storage medium as one or more machine readable or software instructions, that if executed may enable a computing platform to perform one or more actions. "Storage medium" as referred to herein relates to media capable of storing information or instructions which may be operated on, or executed by, by one or more devices or machines. For example, a storage medium may comprise one or more storage devices for storing machine-readable instructions or information. Such storage devices may comprise any one of several media types including, for example, magnetic, optical or semiconductor storage media. For further example, one or more computing platforms may be adapted to perform one or more processes or methods in accordance with claimed subject matter, such as, for example, the methods or processes described herein. However, these are merely examples relating to a storage medium and a computing platform and claimed subject matter is not limited in these respects.

Likewise, the terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

Some portions of the detailed description present above are presented in terms of algorithms or symbolic representations of operations on binary digital signals stored within a memory of a specific apparatus or special purpose computing device, apparatus, or platform. In the context of this particular specification, the term specific apparatus, special purpose computing device, and/or the like may includes a general purpose computer or other computing device, such as a Personal Digital Assistant, portable telephone, cellular telephone, Smart phone, or the like, once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining," "mixing," and/or the like refer to actions or processes of a specific apparatus, such as a special purpose computer, special purpose computing apparatus, or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, audio devices, or display devices of the special purpose computer or similar special purpose electronic computing device.

In the preceding description, various aspects of claimed subject matter have been described. For purposes of explanation, specific numbers, systems or configurations were set forth to provide a thorough understanding of claimed subject matter. However, it should be apparent to one skilled in the art having the benefit of this disclosure that claimed subject matter may be practiced without the specific details. In other instances, features that would be understood by one of ordinary skill were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. An apparatus comprising:
   an accumulator-buffer including:
   a buffer having memory locations for storing one or more media data signal streams,
   a plurality of watermarks, each of the watermarks respectively corresponding to one of a plurality of processors coupled to the accumulator-buffer and each of the watermarks indicating a beginning memory location or an ending memory location in the buffer corresponding to a stored sample from one of the media data signal streams, and
   an accumulator configured to perform arithmetic operations involving at least one of the stored media data signal streams, wherein results of the arithmetic operations are stored in the buffer,
   the accumulator-buffer being configured to mix multiple media data signal streams within the accumulator-buffer.

2. The apparatus of claim 1, wherein said multiple media data signal streams have a same sample rate.

3. The apparatus of claim 2, wherein said multiple media data signal stream comprise audio signals.

4. The apparatus of claim 2, and further comprising one or more additional accumulator buffers coupled so as to process respective multiple media data signal streams in place, wherein said one or more additional accumulator-buffers correspond to one or more additional sample rates.

5. The apparatus of claim 1, wherein said multiple media data streams are at least in part generated by multiple sources.

6. The apparatus of claim 5, wherein said accumulator buffer comprises respective read pointers, write pointers, and watermarks corresponding to at least one or more of said multiple sources.

7. The apparatus of claim 6, and further comprising:
   a controller operable to clear said accumulator buffer intermittently at least in part so that one or more subsequent media stream may be processed in place.

8. The apparatus of claim 7, wherein said controller is further operable to provide an indication if said accumulator buffer has been cleared.

9. The apparatus of claim 7, wherein said controller is further operable to clear one or more portions of said multiple media streams at least in part in response to a completed read operation.

10. The apparatus of claim 1, wherein said at least two of said multiple media data streams at least in part overlap with respect to a time.

11. The apparatus of claim 1, wherein said multiple media data streams comprise at least one of digitized audio data, digitized video data, digitized imaging data, digitized radio data, and digitized television data.

12. A system comprising:
a plurality of processors; and
an accumulator-buffer, coupled to the processors, including:
a buffer having memory locations for storing one or more media data signal streams,
a plurality of watermarks, each of the watermarks respectively corresponding to one of the processors and indicating a beginning memory location or an ending memory location in the buffer corresponding to a stored sample from one of the media data signal streams, and
an accumulator configured to perform arithmetic operations involving at least one of the stored media data signal streams, wherein results of the arithmetic operations are stored in the buffer,
the accumulator-buffer being configured to mix multiple media data signal streams within the accumulator-buffer.

13. The system of claim 12, wherein said multiple media data signal streams have a same sample rate.

14. The system of claim 13, wherein said multiple media data signal stream comprise audio signals.

15. The system of claim 13, and further comprising one or more additional accumulator buffers coupled so as to process respective multiple media data signal streams in place, wherein said one or more additional accumulator-buffers correspond to one or more additional sample rates.

16. The system of claim 12, wherein said multiple media data streams are at least in part generated by said processors.

17. The system of claim 16, wherein said accumulator buffer comprises respective read pointers, write pointers, and watermarks corresponding to at least one or more of said one or more processors.

18. The system of claim 12, wherein said at least two of said multiple media data streams at least at least in part overlap with respect to a time.

19. The system of claim 18, wherein said multiple media data streams comprise at least one of digitized audio data, digitized video data, digitized imaging data, digitized radio data, and digitized television data.

20. The system of claim 12, and further comprising:
a mixer at least in part operable to combine one or more accumulated data streams.

21. The system of claim 20, and further comprising:
a summing buffer at least in part operable to store one or more combined data streams.

22. The system of claim 20, and further comprising:
a resampler at least in part operable to resample one or more accumulated data streams to a different sampling rate or format.

23. The system of claim 22, wherein said resampler is further operable to resample at least two accumulated data streams to a common sampling rate or format.

24. A method comprising:
storing one or more media data signal streams in a buffer included in an accumulator-buffer;
setting a plurality of watermarks, each of the watermarks respectively corresponding to one of a plurality of processors coupled to the accumulator-buffer and each of the watermarks indicating a beginning memory location or an ending memory location in the buffer corresponding to a stored sample from one of the media data signal streams;
mixing multiple media data streams within the accumulator-buffer by performing arithmetic operations involving at least one of the stored media data signal streams using an accumulator included in the accumulator-buffer; and
storing results of the arithmetic operations in the buffer.

25. The method of claim 24, wherein said accumulator buffer is coupled to one or more sources of multiple media data signal streams.

26. The method of claim 24, wherein said multiple media data signal streams have a same sample rate.

27. The method of claim 26, wherein said multiple media data signal stream comprise audio signals.

28. The method of claim 26, and further comprising processing additional multiple media data signal streams in place in corresponding one or more additional accumulator-buffers, wherein said one or more additional accumulator-buffers correspond to one or more additional sample rates.

29. The method of claim 24, wherein said multiple media data streams are at least in part generated by one or more sources.

30. The method of claim 29, wherein said accumulator buffer comprises respective read pointers, write pointers, and watermarks corresponding to at least one or more of said processors.

31. The method of claim 30, and further comprising: setting said read pointer, said write pointer, and said watermark for at least one of said processors.

32. The method of claim 31, and further comprising: sending a signal to said at least one of said processors if its respective watermark has been reached.

33. The method of claim 24, wherein said at least two of said multiple media data streams at least at least in part overlap with respect to a time.

34. The method of claim 33, wherein said multiple media data streams comprise at least one of digitized audio data, digitized video data, digitized imaging data, digitized radio data, and digitized television data.

35. A system comprising:
means for generating multiple media data signal streams;
means for storing at least one of the multiple media data signal streams in a buffer included in an accumulator-buffer;
means for setting a plurality of watermarks, each of the watermarks respectively corresponding to one of a plurality of processors coupled to the accumulator-buffer, and each of the watermarks indicating a beginning memory location or an ending memory location in the buffer corresponding to a stored sample from one of the media data signal streams;
means for mixing the multiple media data signal streams using an accumulator, included in the accumulator-buffer, that performs arithmetic operations involving at least one of the stored media data signal streams; and
means for storing the mixed multiple media data signal streams in the buffer.

36. The system of claim 35, wherein said multiple media data signal streams have a same sample rate.

37. The system of claim 36, wherein said multiple media data signal stream comprise audio signals.

38. The system of claim 36, and further comprising one or more additional means for processing additional respective multiple media data signal streams in place in an one or more additional accumulator buffers, wherein said one or more additional accumulator-buffers correspond to one or more additional sample rates.

39. The system of claim 35, wherein said accumulator buffer comprises respective read pointers, write pointers, and watermarks corresponding to at least one or more of said means for generating multiple media data signal streams.

40. The system of claim 35, wherein said at least two of said multiple media data streams at least at least in part overlap with respect to a time.

41. The system of claim 40, wherein said multiple media data streams comprise at least one of digitized audio data, digitized video data, digitized imaging data, digitized radio data, and digitized television data.

* * * * *